United States Patent [19]

Parkhurst et al.

[11] Patent Number: 4,591,862

[45] Date of Patent: May 27, 1986

[54] MONOPULSE RECEIVER FOR A FOUR ARM LOG SPIRAL ANTENNA

[76] Inventors: Ross A. Parkhurst, 10308 Fleming Ave., Bethesda, Md. 20814; John O. Wedel, 4218 Southfield Rd., Ellicott City, Md. 21043

[21] Appl. No.: 647,321

[22] Filed: Sep. 4, 1984

[51] Int. Cl.⁴ .................. G01S 5/02; G01S 13/00
[52] U.S. Cl. ............................ 343/427; 343/447; 343/16 M
[58] Field of Search ............... 343/427, 447, 16 M

[56] References Cited

U.S. PATENT DOCUMENTS

| | | | |
|---|---|---|---|
| 3,229,293 | 1/1966 | Little et al. | 343/447 |
| 3,863,259 | 1/1975 | Boughnou et al. | 343/16 M |
| 4,220,953 | 9/1980 | Carré | 343/16 M |
| 4,331,958 | 5/1982 | Lacomme | 343/16 M |

FOREIGN PATENT DOCUMENTS 56-155875  12/1981  Japan ..................... 343/427

OTHER PUBLICATIONS

An Analysis of Wide-Band Microwave Monopulse Direction-Finding Technique; Bullock et al., IEEE Transactions on Aerospace & Electronic Systems, vol. AES-7, #1, Jan. 71, pp. 188-203.

*Primary Examiner*—Theodore M. Blum
*Assistant Examiner*—David Cain

[57] ABSTRACT

A method of apparatus for determining the rectangular coordinate direction angles of a source of radio signals received by a four arm log spiral antenna and then processed by a beam-forming network to simultaneously generate both sum and difference modes. The sum and difference IF signals are heterodyned to a sum IF signal $\Sigma$ and a difference IF signal $\Delta$. The $\Sigma$ and $\Delta$ signals are combined in an IF network to provide three IF signals, namely $\Sigma+\Delta$, $\Sigma-j\Delta$ and $j\Sigma$, which are thereafter amplitude limited by respective limiting amplifiers. The three limited signals are processed by two phase detectors, which generate voltages $E_x$ and $E_y$ corresponding respectively to the sine of the phase angles of the limited signals $\Sigma+\Delta$ and $\Sigma-j\Delta$ relative to the limited signal $j\Sigma$. Since each combination of the voltages $E_x$ and $E_y$ corresponds to a single set of rectangular coordinate direction angles, these direction angles are easily determined by a conventional computer.

9 Claims, 4 Drawing Figures

MONOPULSE RECEIVER FOR A FOUR ARM LOG SPIRAL ANTENNA

RIGHTS OF THE GOVERNMENT

The invention described herein may be manufactured, used, and licensed by or for the United States Government for governmental purposes without payment to us of any royalty thereon.

BACKGROUND OF THE INVENTION

The invention applies generally to methods and apparatus for determining the direction of a source of radio signals received by a four arm log spiral antenna. More particularly, the invention applies to a phase comparison method and apparatus for processing signals from a four arm log spiral antenna receiving signals from a radio source to determine the rectangular coordinate direction angles of the radio source relative to the antenna.

Many types of monopulse receivers are used to process received signals from a four arm log spiral antenna system with dual mode excitation. These known receivers use either amplitude comparison or a combination of amplitude and phase comparison monopulse, such as, for example, described in U.S. Pat. No. 3,863,259, issued Jan. 28, 1975 to Boughnou et al.

In known amplitude comparison systems, linear IF amplifiers are used for signal amplification in the $\Sigma$ and $\Delta$ channels, which must track in both amplitude and phase. Typical IF channel gains (including video) are approximately 100 dB and depending on the application, typical amplitude and phase tracking are required to be within $\pm 2$ dB and $\pm 20°$, respectively. Also, the dynamic range of the received signals are normally sufficiently large that AGC is required for channel linearity.

A phase comparison method and apparatus for use with a four arm log spiral antenna is highly desirable, in that in such a method or apparatus, linear IF amplifiers can be replaced with limiting amplifiers. Also, such a method, using only phase comparison, does not require AGC, log amplifiers, or square law detectors for the conversion from polar to rectangular direction angles, as do present methods and apparatus utilizing amplitude comparison.

OBJECTS AND SUMMARY OF THE INVENTION

Therefore, it is the object of the invention to provide a phase comparison method of processing signals from a four arm log spiral antenna excited in sum and difference modes, to determine the rectangular coordinate direction angles of a source of radio signals received by the antenna.

It is another object of the invention to provide a phase comparison direction finding monopulse receiver for processing signals from a four arm log spiral antenna excited in sum and difference modes, to determine the rectangular coordinate direction angles of a source of radio signals received by the antenna.

In the invention described herein for determining the direction of a source of radio signal received by a four arm log spiral antenna, the antenna is excited in conventional manner by an RF beam-forming network to generate sum and difference RF signals. These sum and difference RF signals are then heterodyned to an intermediate frequency to produce a sum IF signal $\Sigma$ and an difference IF signal $\Delta$.

In the method described herein, the $\Sigma$ and $\Delta$ signals are processed to simultaneously generate three IF signals, namely, $\Sigma + \Delta$, $\Sigma - j\Delta$, and $j\Sigma$, each of which are then limited to a predetermined maximum amplitude. The two limited signals $\Sigma + \Delta$ and $\Sigma - j\Delta$ are then phase detected using the limited signal $j\Sigma$ as a reference, to generate a voltage $E_x$ corresponding to the sine of a phase angle $\beta$ of the limited signal $\Sigma + \Delta$ relative to the limited signal $j\Sigma$, and a voltage $E_y$ corresponding to the sine of phase angle $\alpha$ of the limited signal $\Sigma - j\Delta$ relative to the limited signal $j\Sigma$. Since each set of $E_x$ and $E_y$ values corresponds to a single set of rectangular coordinate angles which unambiguously determine the direction of a radio source or target from the antenna, a conventional computer can be used to determine these rectangular coordinate angles from the voltages $E_x$ and $E_y$.

In the preferred embodiment, the $\Sigma$ and $\Delta$ signals are supplied to an IF network, consisting of conventional signal power splitters and phase shifters, which simultaneously generates the three IF signals $\Sigma + \Delta$, $\Sigma - j\Delta$, and $j\Sigma$. These three signals $\Sigma + \Delta$, $\Sigma - j\Delta$, and $j\Sigma$ are then supplied to three amplifier/limiters, respectively, which limit these three signals to a predetermined maximum amplitude. The limited signals $\Sigma + \Delta$ and $j\Sigma$ are supplied to a first phase detector which generates the voltage $E_x$ corresponding to the sine of the phase angle $\beta$ of limited signal $\Sigma + \Delta$ relative to the limited signal $j\Sigma$. Similarly, the limited signals $\Sigma - j\Delta$ and $j\Sigma$ are supplied to a second phase detector which generates the voltage $E_y$ corresponding to the sine of the phase angle $\alpha$ of the limited signal $\Sigma - j\Delta$ relative to the limited signal $j\Sigma$. The voltages $E_x$ and $E_y$ are then supplied to a computer, which processes the voltages to determine the first and second rectangular coordinate direction angles $e_A$ and $e_B$ of the radio source relative to the boresight of the antenna.

BRIEF DESCRIPTION OF THE DRAWINGS

The invention will be better understood, and further objects, features, and advantages thereof will become more apparent from the following description of a preferred embodiment, taken in conjunction with the accompanying drawings in which.

DESCRIPTION OF A PREFERRED EMBODIMENT

Figure 1:
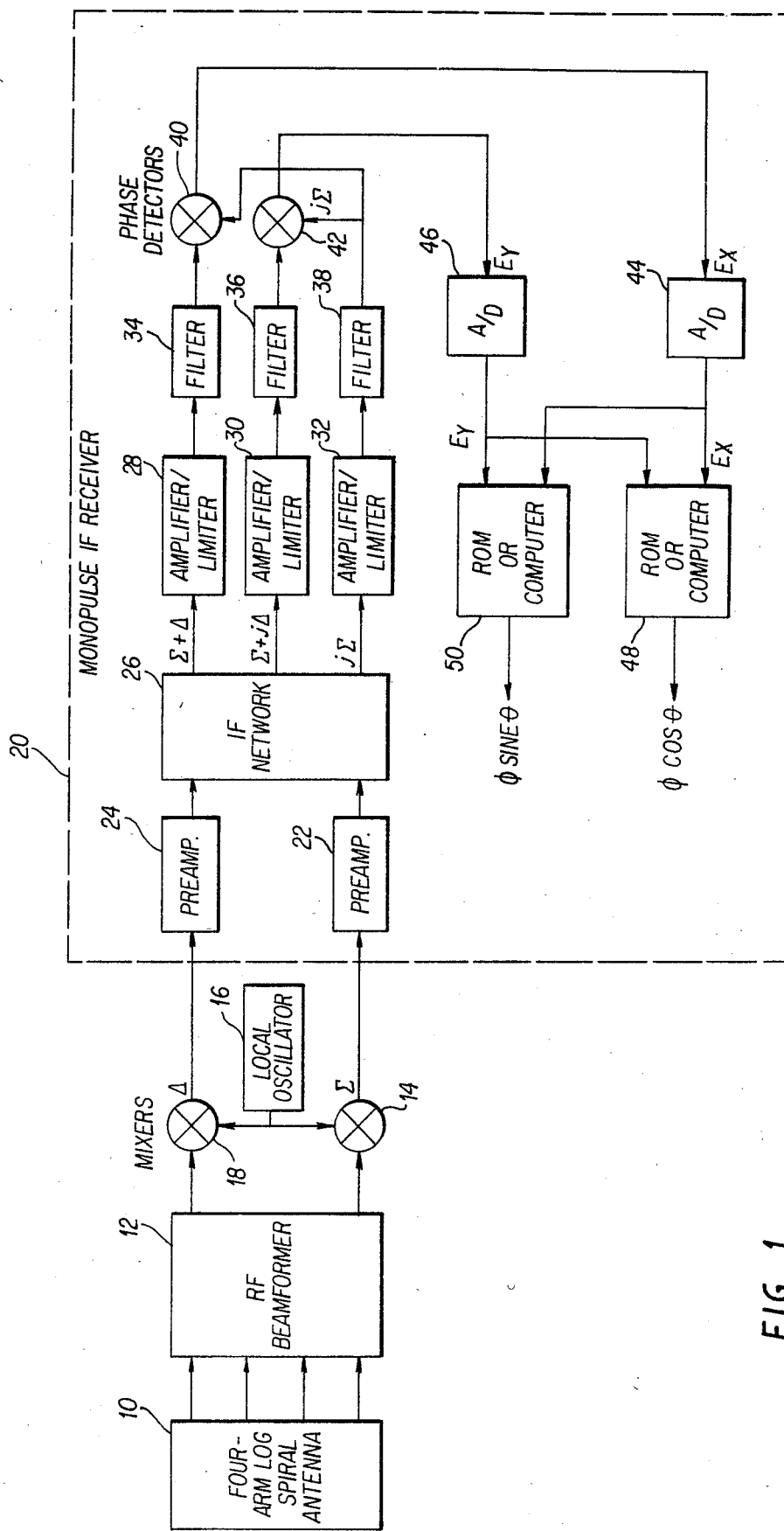
FIG. 1 is a simplified block diagram of the preferred embodiment of the invention.

Referring now to FIG. 1, a four arm log spiral antenna 10 is employed to receive signals from a remote radio source. The signal from antenna 10 is processed in the dual mode by a RF beam-forming network 12, to generate both sum and difference radiation patterns. The sum and difference signals are heterodyned to an intermediate frequency to produce a sum IF signal $\Sigma$ and a difference IF signal $\Delta$. A first mixer 14 is supplied with the RF sum signal from the RF beam-forming network 12, and with a signal $A_o \cos \omega t$ generated by a local oscillator 16 to produce the sum IF signal $\Sigma$. Similarly, a second mixer 18 is supplied with the difference IF signal from the RF beam-forming network 12 and the output signal of the local oscillator 16 to produce the difference IF signal $\Delta$.

The relationship between the $\Sigma$ and $\Delta$ signals is a function of the target polar coordinate angles, as follows:

$$\Sigma = A\Sigma \cos(\omega t + \theta) \tag{1}$$

$$\Delta = A\Delta \cos(\omega t + 2\theta) \tag{2}$$

where $\theta$ is the rotation angle in the plane of the antenna 10, $A\Sigma$ is the amplitude of the $\Sigma$ signal, and $A\Delta$ is the magnitude of the $\Delta$ signal.

Figure 2:
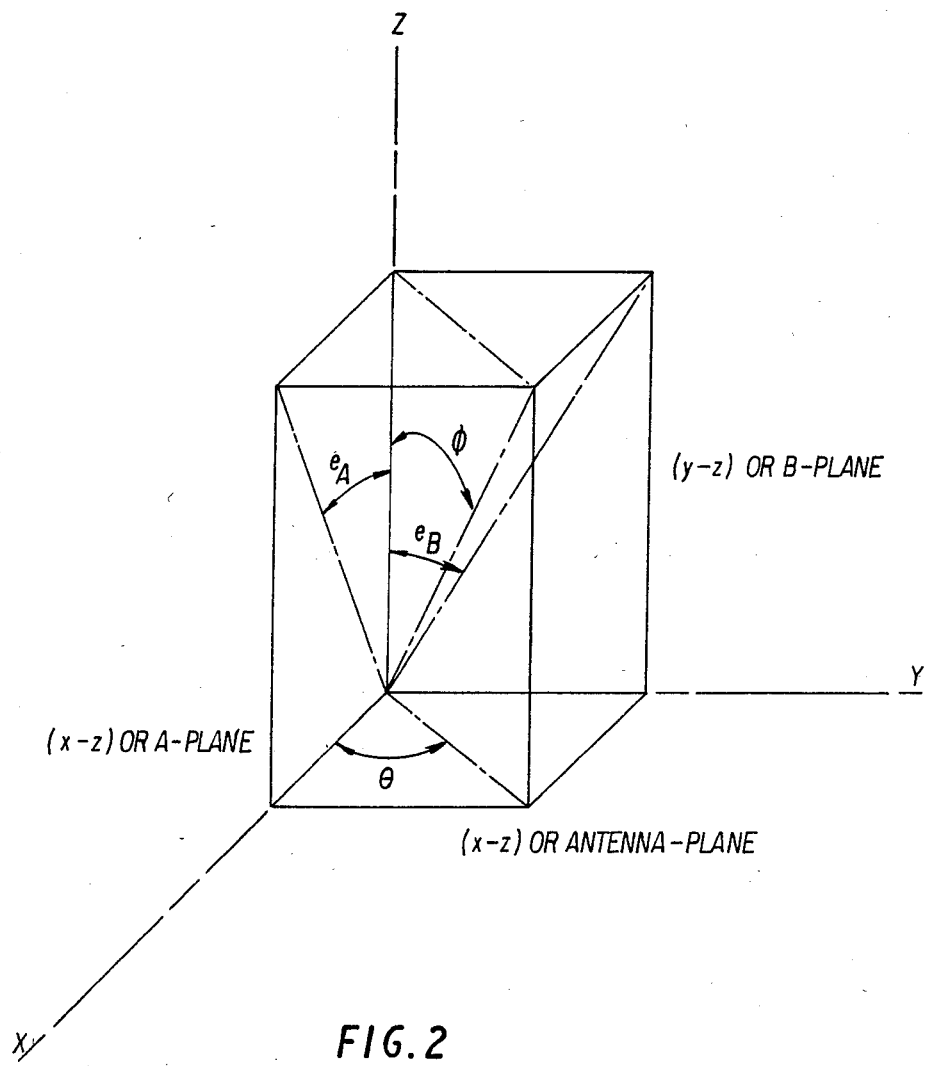
FIG. 2 is a graph showing the coordinate direction angles $e_A$, $e_B$ and their relationship to the polar angles $\phi$, $\theta$.

The polar coordinate direction finding angles $\phi$ and $\theta$, shown in FIG. 2, are derived from the $\Sigma$ and $\Delta$ signals. The angle-off-boresight $\phi$ of the radio source or target is proportional to the difference-over-sum amplitude ratio, that is, $$\phi = \left| \frac{A_\Delta}{A_\Sigma} \right| \tag{3}$$

The rotation angle $\theta$ in the plane of the antenna 10 is equal to the difference in electrical phase $(2\theta - \theta)$ between the $\Sigma$ and $\Delta$ signals. From the foregoing it is seen that the $\Sigma$ and $\Delta$ IF signals, when properly combined, provide unambiguously the polar coordinate direction angles $\phi$, $\theta$ of a radio source or target in space.

However, in many applications of signal direction finding systems, it is necessary to determine the direction of a radio source in the form of rectangular coordinate direction angles rather than polar coordinate direction angles. For example, when the direction finding system is used to guide a missile or aircraft to a radio source or target, the direction finding system may be required to provide rectangular coordinate signals, i.e., pitch and yaw signals, to corresponding guidance elements of the missile or aircraft. The relationship between the polar directional angles $\phi$, $\theta$ and the rectangular coordinate direction angles $e_A$, $e_B$ are shown in FIG. 2. In this figure, the antenna 10 is disposed in the x-y plane, and has a boresight extending along the axis Z perpendicular to the x-y plane. A first rectangular coordinate direction angle $e_A$ is disposed in the x-z or A-plane, and a second rectangular coordinate direction angle $e_B$ is disposed in the y-z or B-plane. The rectangular coordinate direction angles $e_A$ and $e_B$ may be defined as a function of the polar angles $\phi$, $\theta$, as follows:

$$e_A = \tan^{-1}(\tan \phi \cos \theta) \tag{4}$$

$$e_B = \tan^{-1}(\tan \phi \sin \theta) \tag{5}$$

Where the angle-off-boresight $\phi$ is reasonably small, i.e., less than 30°, the rectangular coordinate direction angles $e_A$, $e_B$, may be approximated as follows:

$$e_A \approx \phi \cos \theta \tag{6}$$

$$e_B \approx \phi \sin \theta \tag{7}$$

Referring back to FIG. 1, the $\Sigma$ and $\Delta$ output signals of the mixers 14, 18 are supplied to a phase comparison, direction finding, monopulse receiver 20 which processes the $\Sigma$ and $\Delta$ signals to determine the rectangular coordinate direction angles $e_A$ and $e_B$. In the receiver 20, the $\Sigma$ and $\Delta$ signals are amplified by respective preamplifiers 22, 24, with sufficient gain to establish noise figure. The amplified $\Sigma$ and $\Delta$ signals are then combined in an IF network 26. The IF network 26 consists of conventional signal power splitters and phase shifters for simultaneously generating three IF signals, namely, $\Sigma + \Delta$, $\Sigma - j\Delta$ and $j\Sigma$. Since only relative phases between the three signals $\Sigma + \Delta$, $\Sigma - j\Delta$ and $j\Sigma$ are to be measured and amplitude relationships are not required, these three signals are supplied to three limiting amplifiers 28, 30, 32 which respectively limit these signals to a predetermined maximum amplitude $\pm R$ volts. Although not required for system operation, but for ease of description, three bandpass filters 34, 36, and 38 are shown in the circuit of FIG. 1 following the three limiting amplifiers 28, 30, and 32 respectively. Each of these bandpass filters 34, 36, and 38 will pass only the fundamental frequency of the limited signal $\Sigma + \Delta$, $\Sigma - j\Delta$, or $j\Sigma$ supplied to it.

Figure 3:
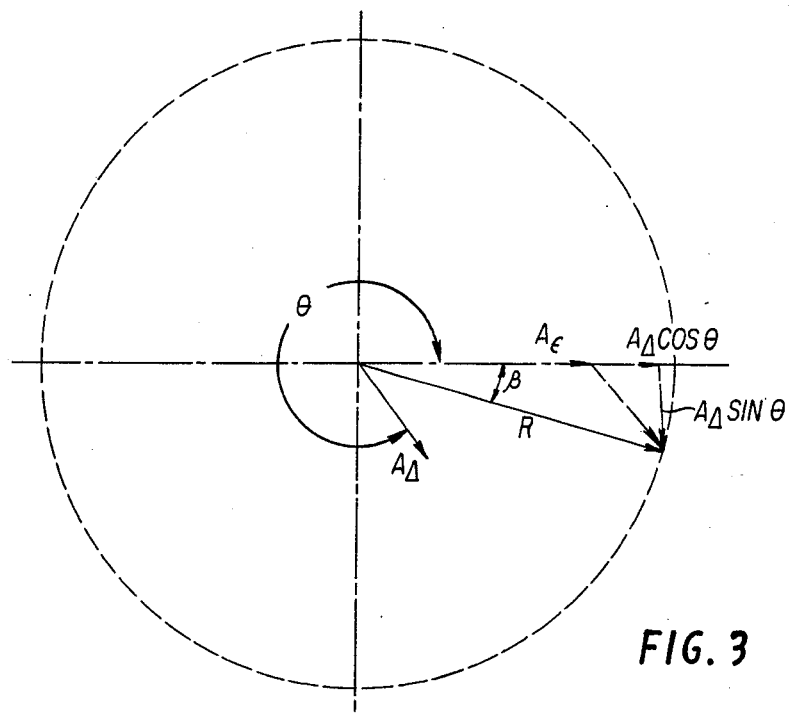
FIG. 3 is a vector diagram of the limited filtered signal $\Sigma + \Delta$.

Referring now to the vector diagram of FIG. 3, it is seen that the angle $\beta$ between the $\Sigma$ signal and the filtered limited signal $\Sigma + \Delta$ can be expressed as follows:

$$\beta = \tan^{-1}\left[ \frac{A_\Delta \sin \theta}{A_\Sigma + A_\Delta \cos \theta} \right] \tag{9}$$

Since $\phi = \left| \frac{A_\Delta}{A_\Sigma} \right|$ then $\beta = \tan^{-1}\left[ \frac{\phi \sin \theta}{1 + \phi \cos \theta} \right] \tag{10}$ Thus, the filtered limited signal $\Sigma + \Delta$ can be derived as $$\Sigma + \Delta = R\cos(\omega t + \beta) = R\cos\left[ \omega t + \tan^{-1}\left( \frac{\phi \sin \theta}{1 + \phi \cos \theta} \right) \right] \tag{11}$$

Figure 4:
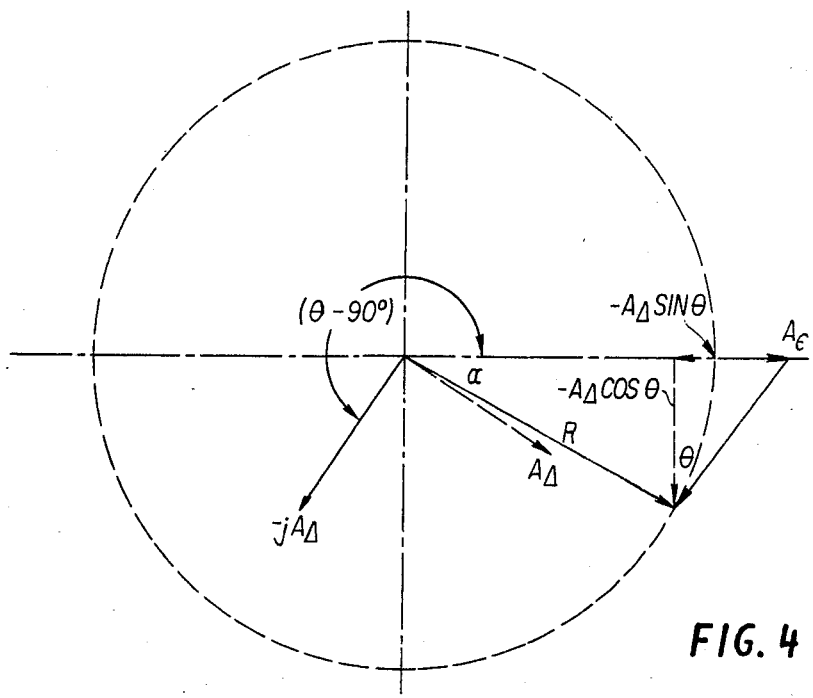
FIG. 4 is a vector diagram of the limited filtered signal $\Sigma - j\Delta$.

Referring now to FIG. 4, the angle $\alpha$ between the signal $\Sigma$ and the filtered limited signal $\Sigma - j\Delta$ is:

$$\alpha = \tan^{-1}\left[ \frac{A_\Delta \sin(\theta - 90°)}{A_\Sigma + A_\Delta \cos(\theta - 90°)} \right] \tag{12}$$

Since $$\sin(\theta - 90°) = -\cos \theta \tag{13}$$

and $$\cos(\theta - 90°) = \sin \theta \tag{14}$$

$$\alpha = \tan^{-1}\left[\frac{-A_\Delta \cos \theta}{A_\Sigma + A_\Delta \sin \theta}\right] \quad (15)$$

or $$\alpha = -\tan^{-1}\left[\frac{\phi \cos \theta}{1 + \phi \sin \theta}\right] \quad (16)$$

Thus, the filtered limited signal $\Sigma - j\Delta$ is equal to $$\Sigma - j\Delta = R\cos(\omega t + \alpha) = R\cos\left[\omega t - \tan^{-1}\left(\frac{\phi \cos \theta}{1 + \phi \sin \theta}\right)\right] \quad (17)$$

The filtered limited signal $j\Sigma$ is:

$$j\Sigma = R \sin \omega t \quad (18)$$

The filtered limited signals $\Sigma + \Delta$ and $j\Sigma$ are supplied to a first phase detector 40 where the filtered limited signal $\Sigma + \Delta$ is phase detected using the filtered limited signal $j\Sigma$ as a reference. Similarly, the filtered limited signals $\Sigma - j\Delta$ and $j\Sigma$ are supplied to a second phase detector 42, where the filtered limited signal $\Sigma - j\Delta$ is phase detected using the filtered limited signal $j\Sigma$ as a reference.

The voltage output $E_x$ of the phase detector 40 is equal to the product of the two signals $\Sigma + \Delta$ and $j\Sigma$.

$$E_x = (R \sin \omega t)(R \cos (\omega t + \beta)) = R^2 \sin \omega t \cos (\omega t + \beta) \quad (19)$$

or $$E_x = \tfrac{1}{2}R^2 \sin (\omega t + (\omega t + \beta)) + \sin (\omega t - (\omega t + \beta))$$

$$E_x = \tfrac{1}{2}R^2 \sin (2\omega t + \beta) - \sin \beta \quad (20)$$

Since $\sin (2\omega t + \beta)$ is an alternating voltage which is filtered out or averages zero, $$E_x = -\tfrac{1}{2}R^2 \sin \beta \quad (21)$$

In similar manner, the voltage output $E_y$ of the phase detector 42 is $$E_y = -\tfrac{1}{2}R^2 \sin \alpha \quad (22)$$

Assuming the final limiter output limit level R is equal to $\sqrt{2}$, the voltage output $E_x$ of the phase detector 40 and the voltage output $E_y$ of the phase detector 42 are:

$$E_x = -\sin \beta = -\sin \tan^{-1}\left(\frac{\phi \sin \theta}{1 + \phi \cos \theta}\right) \quad (23)$$

$$E_y = -\sin \alpha = \sin \tan^{-1}\left(\frac{\phi \cos \theta}{1 + \phi \sin \theta}\right) \quad (24)$$

These two equations can be solved simultaneously for $\phi \sin \theta$ and $\phi \cos \theta$ in terms of $E_x$ and $E_y$ as follows:

From equation (16), $\phi \cos \theta = -\phi \sin \theta \tan \alpha - \tan \alpha$ (25)

From equation (10), $\phi \sin \theta = \phi \cos \theta \tan \beta + \tan \beta$ (26)

Thus, $$\phi \sin \theta = -\phi \sin \theta \tan \alpha \tan \beta - \tan \alpha \tan \beta + \tan \beta \quad (27)$$
$$\phi \sin \theta (1 + \tan \alpha \tan \beta) = \tan \beta (1 - \tan \alpha)$$

$$\phi \sin \theta = \frac{\tan \beta (1 - \tan \alpha)}{1 + \tan \alpha \tan \beta}$$

similarly, $$\phi \cos \theta = -\tan \alpha (\phi \cos \theta) \tan \beta - \tan \beta \tan \alpha - \tan \alpha \quad (28)$$
$$\phi \cos \theta (1 + \tan \alpha \tan \beta) = -\tan \alpha (1 + \tan \beta)$$

$$\phi \cos \theta = -\frac{\tan \alpha (1 + \tan \beta)}{1 + \tan \alpha \tan \beta}$$

Since $E_x = -\sin \beta$ and $E_y = -\sin \alpha$, $$\phi \sin \theta = \frac{\tan \sin^{-1} - E_x(1 - \tan \sin^{-1} - E_y)}{1 + \tan(\sin^{-1} - E_y) \tan(\sin^{-1} - E_x)} \quad (29)$$

and $$\phi \cos \theta = -\frac{\tan \sin^{-1} - E_y(1 + \tan \sin^{-1} - E_x)}{1 + \tan(\sin^{-1} - E_y) \tan(\sin^{-1} - E_x)} \quad (30)$$

Figure 5:
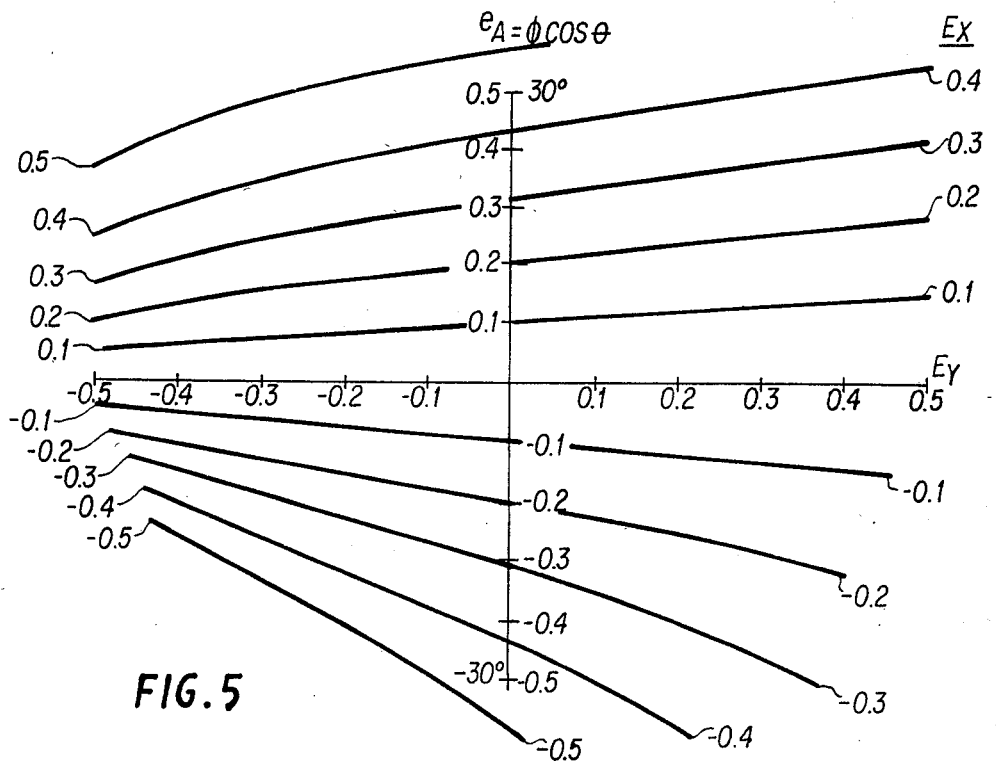
FIG. 5 shows a family of curves, in which values of the coordinate direction angle $e_A$ is plotted as a function of the phase voltages $E_x$ and $E_y$.
Figure 6:
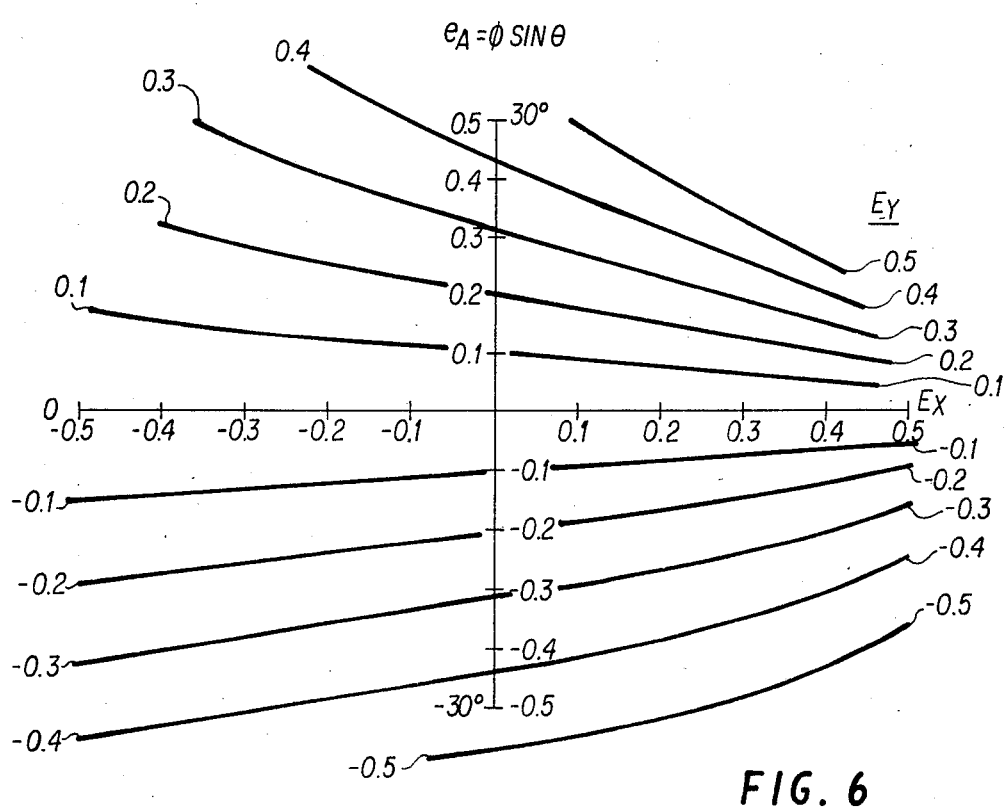
FIG. 6 shows a family of curves in which the coordinate direction angle $e_B$ is plotted as a function of the phase indicating voltages $E_x$ and $E_y$.

In a hardware system, a computer or read only memory (ROM) can be used to solve for $\phi \cos \theta$ and $\phi \sin \theta$ using the voltages $E_x$ and $E_y$. A plot of the A-plane angles $\phi \cos \theta$ as a function of $E_y$ when $E_x$ is a parameter, is shown in FIG. 5. Similarly, FIG. 6 shows the B-plane direction angles $\phi \sin \theta$, as a function of $E_x$ and $E_y$. It can be readily seen from FIGS. 5 and 6 that the voltages $E_x$ and $E_y$ may be used to uniquely define the direction to a point (target) in space.

Referring again to FIG. 1, the voltage $E_x$ is supplied to a first analog-to-digital converter 44 which converts this voltage $E_x$ to a digital signal. Similarly, the voltage $E_y$ is supplied to a second analog-to-digital converter 46, which converts this voltage $E_y$ to a digital signal. The digital signals $E_x$ and $E_y$ are supplied as addresses to a first read only memory (ROM) 48 storing a look-up table of $\phi \cos \theta$ values as a function of $E_x$ and $E_y$ values, to read out of the ROM 48 the A-plane direction angle $\phi \cos \theta$ corresponding to the inputed digital signals $E_x$ and $E_y$. Similarly, the digital signals $E_x$ and $E_y$ are supplied as addresses to a second ROM 50 storing a look-up table of $\phi \sin \theta$ values as a function of $E_x$ and $E_y$ values, to read out of the ROM 50 the B-plane direction angle corresponding to the digital signals $E_x$ and $E_y$. Alternatively, the digital signals $E_x$ and $E_y$ can be supplied to a computer which computes the A-plane direction angle $\phi \cos \theta$ and the B-plane direction angle $\phi \sin \theta$ in accordance with equations (25) and (26), respectively.

Since there are many variations, modifications and additions to the invention described herein which would be obvious to a person skilled in the art, it is intended that the scope of the invention be limited only by the appended claims.

What is claimed and desired to be secured by Letters Patent of the United States is:

1. A method of determining the direction of a source of radio signals received by a four arm log spiral antenna, comprising the steps of:

processing signals from said antenna by an RF beam-forming network to generate sum and difference RF signals:

heterodyning said sum and difference RF signals to an intermediate frequency to produce a sum IF signal $\Sigma$ and a difference IF signal $\Delta$;

processing said $\Sigma$ and $\Delta$ signals to simultaneously generate three IF signals, $\Sigma+\Delta$, $\Sigma-j\Delta$, and $j\Sigma$, respectively;

limiting the three signals $\Sigma+\Delta$, $\Sigma-j\Delta$, and $j\Sigma$, to a predetermined maximum amplitude;

processing the limited signals $\Sigma-j\Delta$ and $j\Sigma$ to generate a voltage $E_y$ corresponding to the sine of the phase angle $\alpha$ of the limited signal $\Sigma-j\Delta$ relative to the limited signal $j\Sigma$;

processing the limited signals $\Sigma+\Delta$ and $j\Sigma$ to generate a voltage $E_x$ corresponding to the sine of the phase angle $\beta$ of the limited signal $\Sigma+\Delta$ relative to the limited signal $j\Sigma$;

determining a first rectangular coordinate direction angle $e_A$ of the radio source relative to a boresight of the antenna from said voltages $E_x$ and $E_y$; and determining a second rectangular coordinate direction angle $e_B$ of the radio source relative to the boresight of the antenna from said voltages $E_x$ and $E_y$.

2. A method, as described in claim 1, wherein:

said first rectangular coordinate direction angle $e_A$ is determined from said voltages $E_x$ and $E_y$ in accordance with the equation $$e_A = \frac{(\tan \sin^{-1} - E_x)(1 - \tan \sin^{-1} - E_y)}{1 - (\tan \sin^{-1} - E_x)(\tan \sin^{-1} - E_y)}$$

said second rectangular coordinate direction angle $e_B$ is determined from said voltages $E_x$ and $E_y$ in accordance with the equation $$e_B = \frac{(\tan \sin^{-1} - E_y)(-1 + \tan \sin^{-1} - E_x)}{1 - (\tan \sin^{-1} - E_x)(\tan \sin^{-1} - E_y)}$$

3. A method, as described in claim 1, wherein the steps of determining the first direction angle $e_A$ and the second direction angle $e_B$ comprising the further steps of:

converting the voltages $E_x$ and $E_y$ to digital signals corresponding to sine $\alpha$ and sine $\beta$, respectively;

supplying the digital signals $E_x$ and $E_y$ to a computer which comprises a first memory in which is stored a look-up table of $e_A$ values as a function of $E_x$ and $E_y$ values, and a second memory in which is stored a look-up table of $e_B$ values as a function of $E_x$ and $E_y$ values;

reading out of the first memory the $e_A$ value corresponding to the values of the digital signals $E_x$ and $E_y$ supplied to the computer; and reading out of the second memory the $e_B$ value corresponding to the values of the digital signals $E_x$ and $E_y$ supplied to the computer.

4. A method, as described in claim 1, which further comprises the step of amplifying the $\Sigma$ and $\Delta$ signals before processing the $\Sigma$ and $\Delta$ signals to generate the three IF signals $j\Sigma$, $\Sigma-j\Delta$, and $\Sigma+\Delta$.

5. A method, as described in claim 1, which further comprises the step of bandpass filtering the three limited signals $j\Sigma$, $\Sigma-j\Delta$ and $\Sigma+\Delta$, before processing these three limited signals to generate the voltages $E_x$ and $E_y$.

6. Apparatus for determining the direction of a source of radio signals received by a four arm log spiral antenna, comprising:

an RF beam-forming network for processing signals from said antenna to simultaneously generate sum and difference RF signals:

signal heterodyning means for heterodyning said sum and difference RF signals to an intermediate frequency to produce a sum IF signal $\Sigma$ and a difference IF signal $\Delta$;

an IF network means for processing said $\Sigma$ and $\Delta$ signals to simultaneously generate three IF signals, $j\Sigma$, $\Sigma-j\Delta$, and $\Sigma+\Delta$, respectively;

signal limiting means for limiting the three signals $j\Sigma$, $\Sigma-j\Delta$, and $\Sigma+\Delta$ to a predetermined maximum amplitude;

a first phase detecting means for processing the limited signals $\Sigma-j\Delta$ and $j\Sigma$ to generate a voltage $E_y$ corresponding to the sine of the phase angle of the limited signal $\Sigma-j\Delta$ relative to the limited signal $j\Sigma$;

a second phase detecting means for processing the limited signals and $j\Sigma$ to generate a voltage $E_x$ corresponding to the sine of the phase angle $\beta$ of the limited signal $\Sigma+\Delta$ relative to the limited signal $j\Sigma$; and computing means for processing said voltage $E_x$ and $E_y$ to determine first and second rectangular coordinate direction angles $e_A$ and $e_B$ of the radio source relative to a boresight of said antenna.

7. Apparatus, as described in claim 6, wherein said computing means further comprises:

analog-to-digital signal converting means for converting said voltages $E_x$ and $E_y$ to digital signals corresponding to sine $\alpha$ and sine $\beta$, respectively;

a first memory means for storing a look-up table of $e_A$ values as a function of $E_x$ and $E_y$ values;

a second memory means for storing a look-up table of $e_B$ values as a function of $E_x$ and $E_y$ values;

first retrieval means for reading out of the first memory means the $e_A$ value corresponding to the values of the digital signals $E_x$ and $E_y$; and second retrieval means for reading out of the second memory means the $e_B$ value corresponding to the values of the digital signals $E_x$ and $E_y$.

8. Apparatus, as described in claim 6, which further comprises signal amplifying means, disposed between said signal heterodyning means and said IF network means, for amplifying said $\Sigma$ and $\Delta$ signals.

9. Apparatus, as described in claim 6, which further comprises bandpass filtering means, disposed between said signal limiting means and said first and second phase detecting means, for filtering the three limited output signals of the signal limiting means to pass only the fundamental frequency of these limited signals.

* * * * *

UNITED STATES PATENT OFFICE
CERTIFICATE OF CORRECTION

Patent No. 4,591,862                    Dated  May 27, 1986

Inventor(s) Parkhurst et al

It is certified that error appears in the above-identified patent and that said Letters Patent are hereby corrected as shown below:

On the title page insert:
   Item 73 to read:

--[73] Assignee: United States of America as represented by the Secretary of the Army, Washington, D.C.--

Item 74 to read:

--[74] Attorney, Agent of Firm - Saul Elbaum; Thomas E. McDonald; Anthony T. Lane

Signed and Sealed this

Thirteenth Day of October, 1987

Attest:

DONALD J. QUIGG

Attesting Officer

Commissioner of Patents and Trademarks